C. H. BEDELL.
PERISCOPE.
APPLICATION FILED APR. 12, 1916. RENEWED FEB. 27, 1918.
1,294,365.
Patented Feb. 11, 1919.
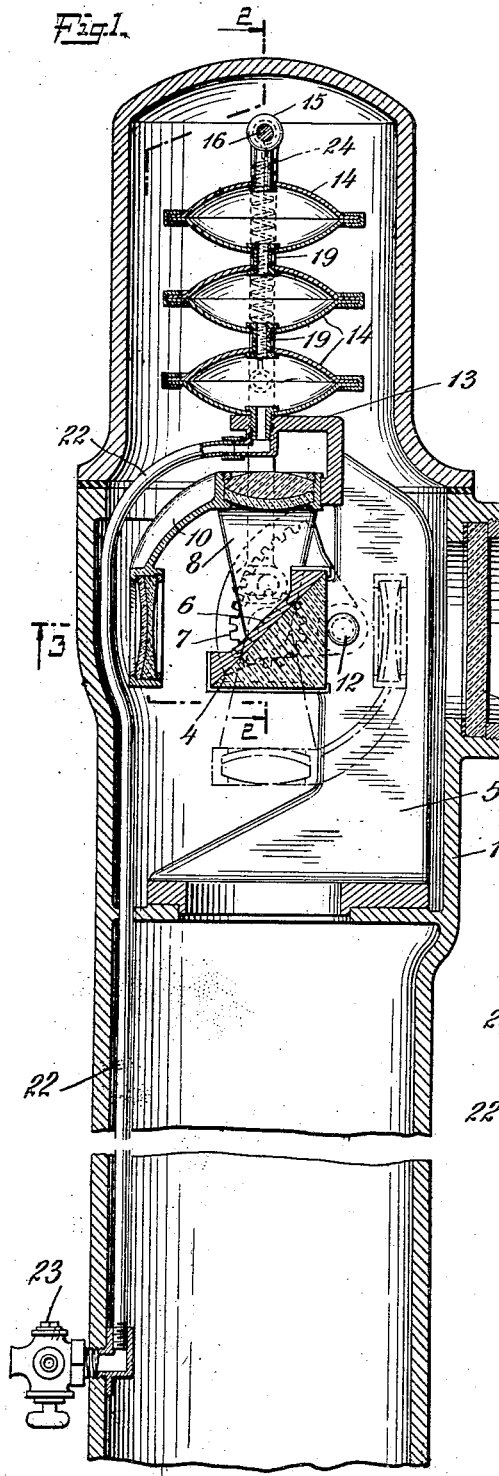
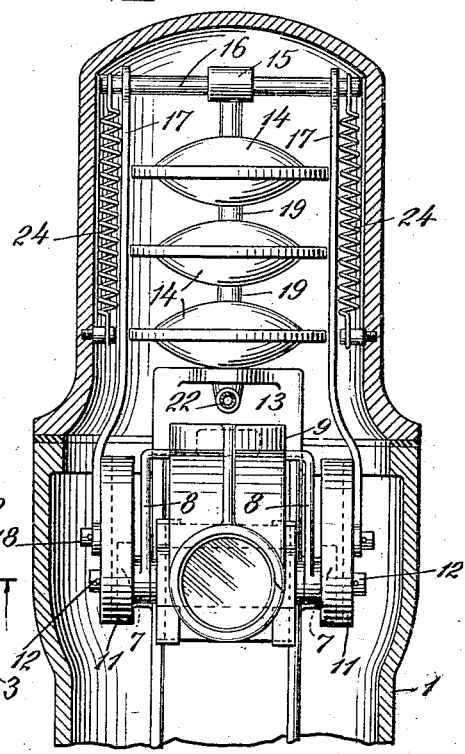
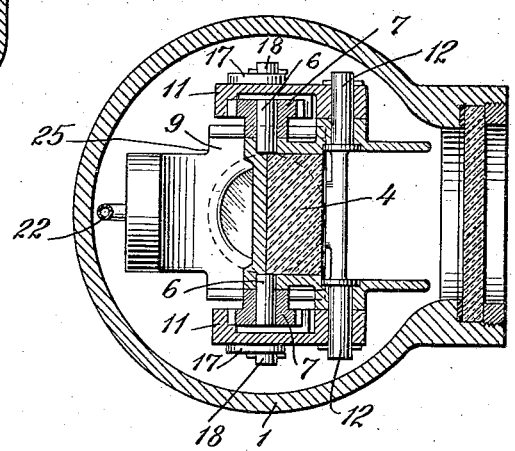
Inventor
Charles H. Bedell
By his Attorneys
Pennie, Davis & Marvin

UNITED STATES PATENT OFFICE.

CHARLES H. BEDELL, OF NEW LONDON, CONNECTICUT, ASSIGNOR TO ELECTRIC BOAT COMPANY, OF NEW YORK, N. Y., A CORPORATION OF NEW JERSEY.

PERISCOPE.

1,294,365.     Specification of Letters Patent.     Patented Feb. 11, 1919.

Application filed April 12, 1916, Serial No. 90,553. Renewed February 27, 1918. Serial No. 219,501.

*To all whom it may concern:*

Be it known that I, CHARLES H. BEDELL, a citizen of the United States, (whose residence and post-office address is New London, county of New London, State of Connecticut,) have invented certain new and useful Improvements in Periscopes; and I do hereby declare the following to be a full, clear, and exact description of the invention, such as will enable others skilled in the art to which it appertains to make and use the same.

This invention relates to periscopes, and particularly to periscopes for submarine boats. Periscopes as now constructed for submarine boats embody a hermetically sealed tube projecting to the desired distance above the vessel and having at or near its upper end an objective for receiving the image to be viewed, and at its lower end within the hull of the boat a suitable eye-piece through which the image may be observed by means of interposed reflectors at the objective and the eye-piece.

It is essential to the satisfactory use of a periscope that the periscope tube contain dry air or other gas and be hermetically sealed against the admission of moisture, as otherwise the lowering of the temperature, such for instance as produced by the submergence of the periscope into the water colder than the air will cause the contained moisture to condense on the surfaces of the lenses and other optical members of the system and obscure the image so that accurate observation is impossible.

It is also desirable to arrange in the lens system of the periscope certain shiftable elements whereby the magnifying power of the periscope may be altered to permit either an observation of wide extent or a magnified view of a smaller extent.

The use of such shiftable elements has heretofore resulted in a serious difficulty by reason of the fact that the adjustment was effected by the manipulation of a part mounted for movement in the wall of the periscope tube to permit the adjusting to be done by the observer at the eye-piece. Notwithstanding the accuracy and care with which such devices have been made, it has been found impossible to make the mounting of the movable part absolutely air-tight so as to preserve the seal of the periscope, and in time the air within the periscope becomes saturated with moisture, dimming the optical elements as above described.

The object of my invention is to provide a bi-focal periscope embodying shiftable elements within the periscope tube and operatable from a point without the tube, but designed so as to avoid the use of a part movably mounted in the wall of the tube whereby entrance of moisture to the tube is entirely prevented.

A further object of the invention is to provide a bi-focal periscope in which the adjustable optical elements may be operated by power from the compressed air line of the vessel.

A further object of the invention is to generally improve the construction of bi-focal periscopes, as will be apparent from the following description taken in conjunction with the annexed drawings, wherein I have illustrated a preferred embodiment of my invention.

In said drawings,

Figure 1 shows in longitudinal vertical section the upper portion of the periscope and also a portion of the periscope tube adjacent the eye-piece and carrying the control device for causing the movement of the shiftable carrier;

Fig. 2 is a vertical section through the part of the periscope on line 2—2 of Fig. 1; and Fig. 3 is a transverse sectional view on line 3—3 of Fig. 1.

Referring to the drawings, 1 indicates the periscope tube having the lateral opening 2 closed by the objective glass 3 which may have either plane surfaces as shown or curved surfaces to constitute one of the lenses of the system. Back of the glass 3 and fixedly supported on the periscope is a prismatic reflector 4, the same being supported between a pair of spaced standards 5 whose base is carried by a transverse web of the periscope tube.

Set in the rear edges of the standards 5 with their centers corresponding with the horizontal middle line of the reflecting surface of the reflector 4, are two stub-shafts 6 on each of which is mounted a pinion 7 rigidly attached to the hubs of swinging bracket arms 8 which support the integrally attached lens-bracket 9. The lens-bracket 9 comprises a lens supporting web connecting the outer ends of the arms 8 and an arm 10 projecting from the web and curved to be substantially concentric with the axis of rotation of the bracket-arms. The arm 10 carries at its end a second lens, the two lenses being substantially 90° apart, whereby in one position of adjustment as shown in full lines in Fig. 1, both lenses are out of the path of the rays through the objective and through the reflecting prism, and in the other position of adjustment one of the lenses is positioned between the objective and the prism and the other lies below the prism in the path of the reflected rays.

For actuating the pinions 7 there is provided for each pinion a sector-shaped rack 11 having internal teeth, the said racks being mounted on stub-shafts 12 set in the standards 5 in front of the shafts 6. The standards 5 are extended above the prism 4 and are connected by an upper bridge 13 on which is supported a stack of three connected expansible vessels 14, the upper one of which carries a cross-head 15 to which is attached rod 16 connected by suitable operating links 17 with pins 18 set in the outer faces of the sectors 11. Each vessel 14 is formed of two elastic metal diaphragms clamped together with their concave faces adjacent. The adjacent vessels are connected by means of short tube sections 19 and the lower vessel is connected to a nipple set in the bridge 13 and connected to the air pipe 22 extending down the periscope tube close to the wall thereof and having airtight connections with an elbow threaded through the wall of the tube and connected by a valve 23 with the air line of the vessel. The valve 23 is a two-way cock adapted in one position to connect the pipe with the air line and in the other position to close the air line and connect the pipe 22 with the exhaust opening in the face of the valve. The movement of the lens-carrier in the direction opposite to that effected by the admission of compressed air to the vessel 14 is accomplished by means of tension springs 24 arranged between the ends of the rod 16 and fixed pins set in the inner wall of the periscope tube.

The operation of the device will be obvious from the above description. When it is desired to use the periscope with the additional lenses in the system, the cock 23 is adjusted to connect the pipe 22 with its exhaust opening whereby the pull of the springs 24 will collapse the vessels 14 and turn the lens carrying bracket in a counter-clockwise direction to shift the lenses from the position shown in full lines to the dotted line position. When it is desired to make observations without the additional lenses of the system the valve is turned to connect the valve 22 to the air line of the boat thereby expanding the vessels 14 and raising the sectors 11 to rotate the lens-carrier back to the position shown in full lines in Fig. 1, in which position the lenses are maintained by the engagement of the forward edge of the lens carrier with a stop formed on the web at the top of the standards 5. The opposite position of adjustment of the lenses is fixed by the engagement of the shoulders 25 of the lens carrier with the standards.

It will be observed that all connections in the air line are between relatively fixed parts whereby the shifting mechanism may be absolutely sealed against loss of air and the air or other gas in the periscope may be indefinitely maintained free from moisture.

The pneumatic operating mechanism is particularly desirable for the reason that it shifts the carrier without shock or jar against its stops and also cushions the action of the spring on the return movement by reason of the small exhaust opening in the valve 23.

I claim:

1. In a periscope the combination of a periscope tube, an optical system in said tube comprising optical elements movably mounted for adjustment into and out of operative position in said system, a fluid pressure operated device in said tube for shifting said elements, and means for controlling said device from without said tube comprising a connection between said control and said pressure operated device having fixed connection with the wall of said tube.

2. In a periscope the combination of a periscope tube, an optical system in said tube comprising movably mounted elements for adjustment into and out of position in said system, an expansible fluid motor for operating said shiftable elements, and means for delivering motive fluid to said motor comprising a pipe having an air-tight passage through the wall of said tube.

3. In a periscope the combination of a periscope tube, an optical system in said tube comprising movably mounted elements for adjustment into and out of position in said system, an expansible fluid motor for operating said shiftable elements fixedly connected to each other and having relatively movable portions whereby the escape of motive fluid into the periscope tube is prevented, and means for delivering motive fluid to and from said motor comprising a pipe having an air-tight passage through the wall of said tube.

4. In a periscope the combination of a periscope tube, an optical system comprising a pivotally mounted lens-carrier adapted to be adjusted to a position to shift its lenses into and out of operative position in said system, and means for swinging said carrier comprising a cross head, reciprocating links operatively connecting said cross head and carrier, and an expansible fluid motor for operating said cross head, said motor comprising a plurality of expansible vessels having flexible walls, and means for delivering motive power to said vessels comprising a pipe passing through the wall of said tube having air-tight connection therewith.

5. In a periscope the combination of a tube, an optical system therein embodying the pivotally mounted lens carrier adapted to be adjusted to shift its lenses into and out of operative position in said system, a fixed stop for positioning said lens carrier in its operative position, a spring for holding said carrier against said stop and means for shifting said carrier away from said stop consisting of an expansible fluid motor fixedly supported in said tube adjacent said lens carrier and having its movable element operatively connected thereto, and means operatable from without said tube for controlling the admission of motive fluid to said motor and the exhaust thereof from said motor.

6. In a periscope the combination of a periscope tube adapted to be hermetically sealed, a shiftable member in said tube and means for effecting the operation of said member from without said tube comprising an expansible vessel having one wall fixed and its opposite wall operatively connected to the part to be shifted, and means for delivering motive fluid to and from said vessel comprising a pipe connecting with the interior of said vessel at its fixed point, the opposite end of said pipe passing through the wall of said tube and having air-tight connection therewith.

7. In a periscope the combination of a periscope tube adapted to be hermetically sealed, a shiftable member in said tube, means for effecting the operation of said member from without said tube comprising an expansible vessel having one wall fixed and its opposite wall operatively connected to the part to be shifted, and means for delivering motive fluid to and from said vessel comprising a pipe connecting with the interior of said vessel at its fixed point, the opposite end of said pipe passing through the wall of said tube and having air-tight connection therewith, a spring for shifting said part in a direction opposite to the direction of movement effected by the expansion of said vessel and a valve in said pipe outside of said tube having passages for connecting said vessel to said motive fluid supply or to an exhaust port without the periscope tube.

In testimony whereof I affix my signature.

CHARLES H. BEDELL.

Copies of this patent may be obtained for five cents each, by addressing the "Commissioner of Patents, Washington, D. C."